United States Patent
Thiel

(10) Patent No.: US 6,758,480 B1
(45) Date of Patent: Jul. 6, 2004

(54) SEALING SYSTEM FOR A DRIVE UNIT CONSISTING OF A MOTOR AND A TRANSMISSION

(75) Inventor: Alfred Thiel, Sprockhövel (DE)

(73) Assignee: Kone Corporation, Helsinki (FI)

(*) Notice: Subject to any disclaimer, the term of this patent is extended or adjusted under 35 U.S.C. 154(b) by 0 days.

(21) Appl. No.: 09/830,291

(22) PCT Filed: Oct. 6, 1999

(86) PCT No.: PCT/EP99/07513
§ 371 (c)(1),
(2), (4) Date: Jul. 10, 2001

(87) PCT Pub. No.: WO00/25047
PCT Pub. Date: May 4, 2000

(30) Foreign Application Priority Data

Oct. 26, 1998 (DE) .......................... 198 49 237

(51) Int. Cl.[7] .............................................. F16J 15/02
(52) U.S. Cl. ..................... 277/630; 277/908; 198/330
(58) Field of Search ................. 277/630, 908; 198/330

(56) References Cited

U.S. PATENT DOCUMENTS

| | | | | |
|---|---|---|---|---|
| 2,020,002 A | * | 11/1935 | Schweich ................... 295/42.1 |
| 2,770,506 A | * | 11/1956 | Derner ........................ 384/468 |
| 3,599,990 A | * | 8/1971 | Greiner et al. ................... 277/4 |
| 3,600,101 A | * | 8/1971 | Oglesby ....................... 415/111 |
| 3,684,301 A | * | 8/1972 | Malaval ......................... 277/59 |
| 3,840,166 A | * | 10/1974 | Gross ............................ 277/74 |
| 4,005,948 A | * | 2/1977 | Hiraga et al. ................ 417/269 |
| 4,326,838 A | * | 4/1982 | Kawashima et al. ......... 417/269 |
| 4,346,801 A | * | 8/1982 | Redder et al. ............... 198/500 |
| 4,543,038 A | * | 9/1985 | Kitaguchi .................... 415/112 |
| 4,653,991 A | * | 3/1987 | Takao et al. ................... 418/82 |
| 4,737,087 A | * | 4/1988 | Hertell ........................... 418/1 |
| 4,776,756 A | * | 10/1988 | Sweeney ................. 415/122 R |
| 4,817,846 A | * | 4/1989 | Eichinger ........................ 277/9 |
| 4,896,561 A | * | 1/1990 | Hayakawa et al. ........ 74/606 R |
| 4,966,532 A | * | 10/1990 | Fengsheng ................... 417/366 |
| 5,224,762 A | * | 7/1993 | Levenstein .................... 299/42 |
| 5,226,787 A | * | 7/1993 | Freeman ................... 415/168.2 |
| 5,379,877 A | * | 1/1995 | Hoefling ...................... 198/330 |
| 5,388,473 A | * | 2/1995 | Black ........................... 74/361 |
| 5,676,382 A | * | 10/1997 | Dahlheimer .................. 277/92 |
| 6,077,050 A | * | 6/2000 | Beck ........................... 417/269 |
| 6,247,575 B1 | * | 6/2001 | Thiel ............................ 198/330 |
| 6,325,175 B1 | * | 12/2001 | Dittrich et al. ............. 184/6.16 |

FOREIGN PATENT DOCUMENTS

| | | |
|---|---|---|
| DE | 32 38 780 C1 | 1/1984 |
| DE | 42 42 762 A1 | 6/1994 |
| EP | A1 0 608 672 | 8/1994 |

OTHER PUBLICATIONS

HAAS et al., *Konstruktion* 39 (1987), 3rd Issue, pp. 107–113.

* cited by examiner

*Primary Examiner*—J. J. Swann
*Assistant Examiner*—Carlos Lugo

(57) ABSTRACT

A sealing system for fast-running motors with a directly flanged-on gear unit, used for passenger conveyor systems such as escalators and moving walkways, is provided. The sealing system includes at least one sealing element comprising a radial shaft seal, at least one centrifugal element, at least one cover and suctioning element, and a lubricating oil collection chamber. The lubricating oil collection chamber being provided in a region of the centrifugal element and connected via at least one channel that extends in the direction of the cover and suctioning element to a gear unit chamber of the gear unit, the gear unit chamber being located above an oil level in an intake region of the cover and suctioning element. The cover and suctioning element is arranged between the gear unit and the sealing element.

10 Claims, 3 Drawing Sheets

SEALING SYSTEM FOR A DRIVE UNIT CONSISTING OF A MOTOR AND A TRANSMISSION

BACKGROUND OF THE INVENTION

The invention relates to a sealing system for drive units consisting of motors, in particular fast-running motors, with a directly flanged-on gear unit, in particular for passenger conveyor systems, such as escalators and moving walkways.

German reference 42 42 762 discloses a gear unit, used in particular for the drive units of escalators, moving walkways or the like. The input shaft and/or the output shaft of this gear unit rests on tapered roller bearings and is sealed axially toward the outside by at least one shaft seal, wherein a lubricating oil circulating element is provided axially between the tapered roller bearing and the shaft seal. Owing to the design, however, the tapered roller bearing pumps out the lubricating oil. The lubricating oil-circulating element is a component that holds the tapered roller bearing (s), wherein the component is an adjustment screw provided with centrifugal elements. The shaft seal consists of several chambers that can be axially pre-tensioned between the sealing elements that form. It was the object of the aforementioned reference to eliminate almost completely the leakage in the shaft of a gear-unit, in particular a worm gear unit, thus increasing the operating time, and to securely avoid damage to the sealing lip or sealing lips of the shaft seal, even if there is a lack of lubrication. Worm gears as a rule represent slow-moving gear unit elements, so that it may be difficult in some circumstances to supply the respective sealing lip with lubricating oil, so as to prevent it from failing prematurely.

German reference C 32 38 780 discloses a lubricating oil system for gear units, comprising at least one oil-collecting pocket and an annular collecting groove, open toward the peripheral surface of a rotating gear unit shaft, for lubricating oil pumped by a pump that is arranged on the gear unit shaft. Radial channels are assigned to the pump for this and the pump intake location is connected to the oil-collecting pocket, wherein at least one channel extends from the annular collecting groove toward the inside of the gear unit shaft and to at least one lubricating point arranged on the inside of the gear unit shaft. The pump is designed as centrifugal pump and comprises an essentially disk-shaped impeller provided with vanes. The radial channels are designed as radially inward extending reversing channels, installed permanently on the housing, which extend from a hydraulic oil collecting chamber arranged radially on the outside of the centrifugal pump toward the inside and are connected to the annular collection groove.

The German magazine Konstruktion 39 (1987), $3^{rd}$ Issue, pages 107–113 shows non-contacting shaft seals for liquid-splattered sealing locations. This reference provides a general design overview for non-contacting sealing systems in use. It also provides clues for configuring the ambient installation area for the sealing system, the sealing element itself as well as the re-circulation of the liquid. In addition, reference is made to problems concerning the undesirable inflow of dust into the chamber to be sealed off, which have not yet been solved.

SUMMARY OF THE INVENTION

It is the object of the present invention to improve a sealing system with simple design for drive units, consisting of motors with directly flanged-on gear units, in particular fast-running motors, in such a way that on the one hand a leakage during the transport (tilting) and installation of the passenger conveying system is securely avoided and, on the other hand, the lubricating oil is securely prevented from flowing out of the gear unit in the direction of the motor, even during a later seal failure in the operating condition.

This object is achieved with a sealing system for drive units consisting of motors, particularly fast running motors with a directly flanged-on gear unit, used especially for passenger conveyor systems such as escalators and moving walkways. The sealing system comprises at least one sealing element designed as radial shaft seal, at least one centrifugal element as well as at least one cover and suctioning element, which is arranged on the gear unit side in front of the sealing element. A lubricating oil collecting chamber provided in the region for the centrifugal element is connected via at least one channel extending in the direction of the cover and suctioning element to the gear unit chamber located on the intake side of the cover and suctioning element, approximately above the oil level.

Advantageous modifications of the subject matter of the invention follow from the dependent claims.

On the one hand, the subject matter of the invention allows the movement of the passenger conveyor system, such as an escalator or a moving walkway, independent of the respective angles of inclination. On the other hand and owing to the system for re-circulating the lubricating oil, it makes it possible to safely prevent lubricating oil from flowing out of the gear unit in the direction of the motor during operations, even in case of failure of the sealing element that operates contacting, at least once it is installed.

During the fully mounted state of the passenger conveyor system, the oil level inside the gear unit chamber can be lowered to a level below the largest peripheral extension of the cover and suctioning element thus making it possible to save several liters of lubricating oil for each gear unit. As a result of its spatial arrangement as well as the outer peripheral surface that is tapered in the direction of the sealing element, the cover and suctioning element on the one hand prevents that lubricating oil (centrifugal oil) outside of the oil level is constantly pumped with more or less high pressure in the direction of the sealing element. On the other hand, it ensures that the lubricating oil, which has actually penetrated the sealing element, is once more suctioned in via the centrifugal disk in the direction of the lubricating oil collection chamber and via the channel in the direction of the gear unit chamber. In both cases, the centrifugal force of the cover and suctioning element is utilized on location for the respective purpose.

The subject matter of the invention thus creates a lubricating oil circulation system that is effective even if the sealing element has failed during operations and in any case securely prevents lubricating oil from leaving the gear unit in the direction of the directly flanged-on motor. The sealing system, which is preferably designed as installation unit, is a one-piece structural component, consisting of the cover and suctioning element and the centrifugal element, wherein the radial shaft seal, which may be designed with several lips if necessary, is mounted on a radially offset leg of the centrifugal element.

As a result of the circulation system for the possibly escaping lubricating oil, designed in this way, the sealing element is actually unnecessary during the operating state. The element therefore actually serves only a transport and installation purpose and is operatively connected to a transport safety device that may exist, which ensures an effective separation of the lubricating oil collection chamber from the channel extending in the direction of the gear unit chamber.

The seal location between an especially fast-running motor and a gear unit filled with synthetic oil must be considered a problem for the following reasons:

Synthetic oil is not compatible with all types of sealing lip material. Also, not all sealing-lip materials are resistant to high temperatures, such as occur in particular with fast-running motor output shafts.

During the step or tread pad installation and replacement, a temperature of more than 100 degrees Celsius is easily reached during the inching mode, considering the fact that the motor runs up during the short period, but that the associated ventilator cannot produce the necessary cooling output. Thus, a sealing lip material on the basis of Viton®[1] offers itself for this. Over the long run, this high-temperature resistant sealing lip material, however, is not resistant to synthetic oil, so that one of the parameters is taken into account, but not the other one.

[1] Note: registered trademark for series of fluoroelastomers (see attached page)

With respect to their service life, radial shaft sealing rings on NBR[2] basis are mostly resistant against synthetic oil, but will fail after relatively short service life periods at the aforementioned high temperatures.

[2] Note: NBR=nitrile-butadiene rubber (see attached pages)

Thus, the shaft-sealing ring, which can easily be omitted during the operating state since the re-circulation of the lubricating oil to the gear unit chamber is ensured by the other sealing system components, therefore can be produced as cheap NBR component. Thus the sealing system can be produced very cheaply in this problematic area and can be installed as one unit. A possible retrofitting with the sealing system designed as installation unit is also conceivable.

BRIEF DESCRIPTION OF THE DRAWINGS

The subject matter of the invention is shown in the drawing with an exemplary embodiment and is described as follows. Shown are in.

DETAILED DESCRIPTION OF THE INVENTION

Figure 1:
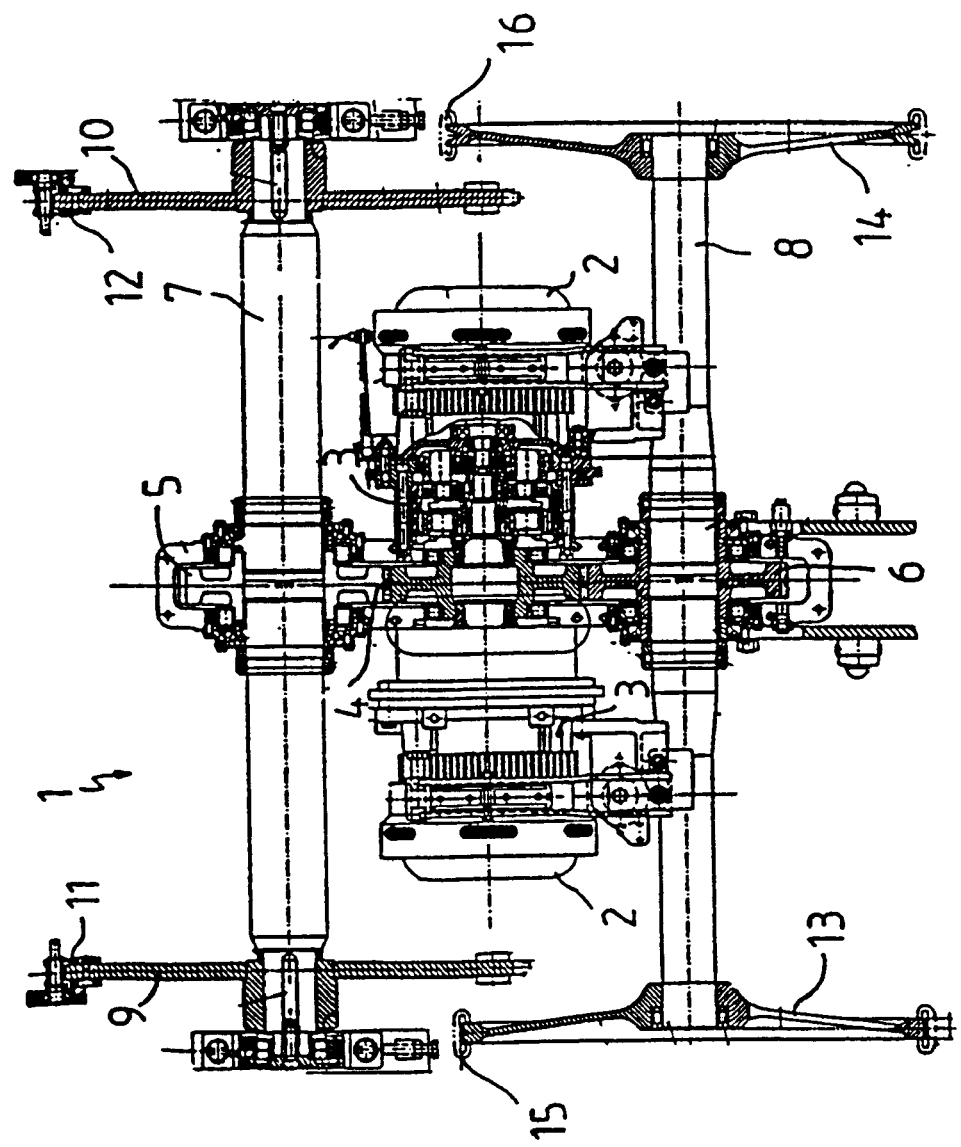
FIG. 1—A drive system for a passenger conveyor system, for example an escalator.

FIG. 1 shows a drive system 1 for a passenger conveyor system, for example an escalator, which is not shown in further detail here. For this example, the drive system 1 comprises a drive unit consisting of motor 2 and gear unit 3 in a folding-down symmetrical arrangement, wherein the gear unit 3 is a multistage epicyclic gear and the motor 2 is a fast-running electric motor. The drive unit 2, 3 is operatively connected via drive elements 4, 5, 6 to the shafts 7, 8. The shaft 7 carries reversing wheels 9, 10 for the only indicated transport chains 11, 12 for steps that are not shown in further detail herein. The shaft 8 carries reversing wheels 13, 14 for handrails 15, 16 that are only indicated herein.

Figure 2:
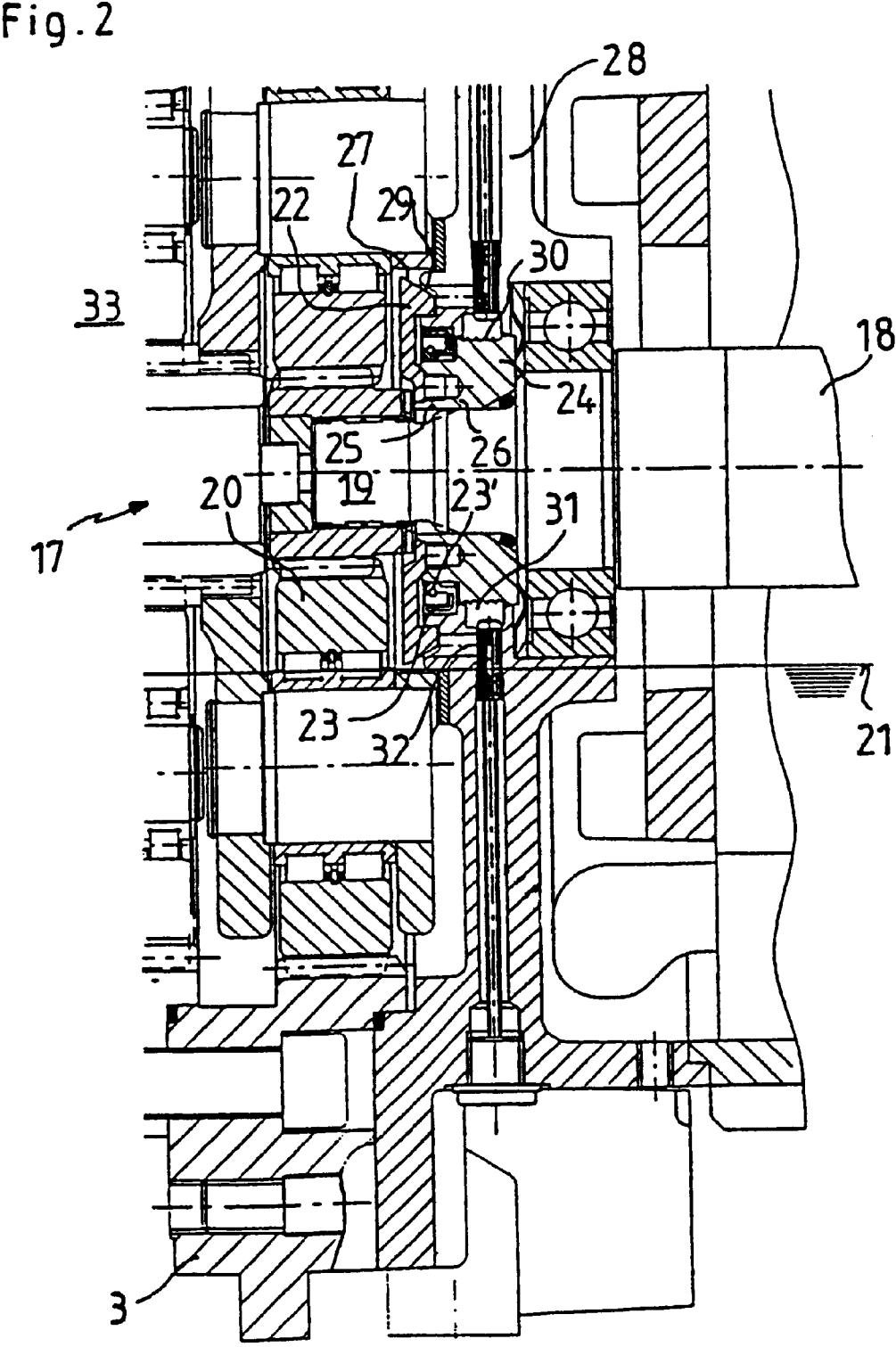
FIG. 2—A sectional representation of the transition region for motor/gear unit in connection with the sealing system according to the invention.

FIG. 2 contains a sectional representation of the transition region 17 from the motor, not shown in further detail here, to the gear unit 3. The motor output shaft 18 (for example n=1800 RPM) is recognizable, which is operatively connected in the region of its free end via a pinion 19 to the first stage 20 of a multistage epicyclical gear 3. The oil level in the gear unit 3 is given the reference number 21. The sealing system according to the invention itself consists of the structural components cover and suctioning element 22, sealing element 23, as well as centrifugal element 24. The cover and suctioning element 22 in this case is pressed onto a projection 25 on the centrifugal element 24 and is operatively connected to the radially shorter dimensioned axial leg 26 of centrifugal element 24. The sealing element 23 for this example is designed as radial shaft sealing ring on NBR basis. The cover and suctioning element 22, which is arranged on the gear unit side, has an outer peripheral surface 27 that is conically tapered in the direction of sealing element 23, wherein a labyrinth-type gap 29 forms between the housing component 28 for gear unit 3 and the cover and suctioning element 22. The disk-shaped centrifugal element 24 has a labyrinth-type channel system 30 in the region of its outer peripheral surface, which guides the lubricating oil that may escape through the sealing element 23 (sealing lip 23') into the chamber 31 that surrounds the centrifugal element 24. During the operating state, the escaping lubricating oil can subsequently be circulated back in the direction of the gear unit inside chamber 33 via an approximately axially extending channel 32. Thus, the cover and suctioning element 22 actually serves two purposes. On the one hand, owing to the geometric form of the outer peripheral surface 27 and conditional upon the centrifugal force, it is designed to keep lubricating oil that is present outside of the oil level for the most part away from the sealing element 23. On the other hand and also owing to the centrifugal force, it is designed to cause an intake effect approximately on the level of oil level 21. As a result of this intake effect, lubricating oil in the collection chamber 31 is circulated via the channel 32 back to the gear unit inside chamber 33.

Figure 3:
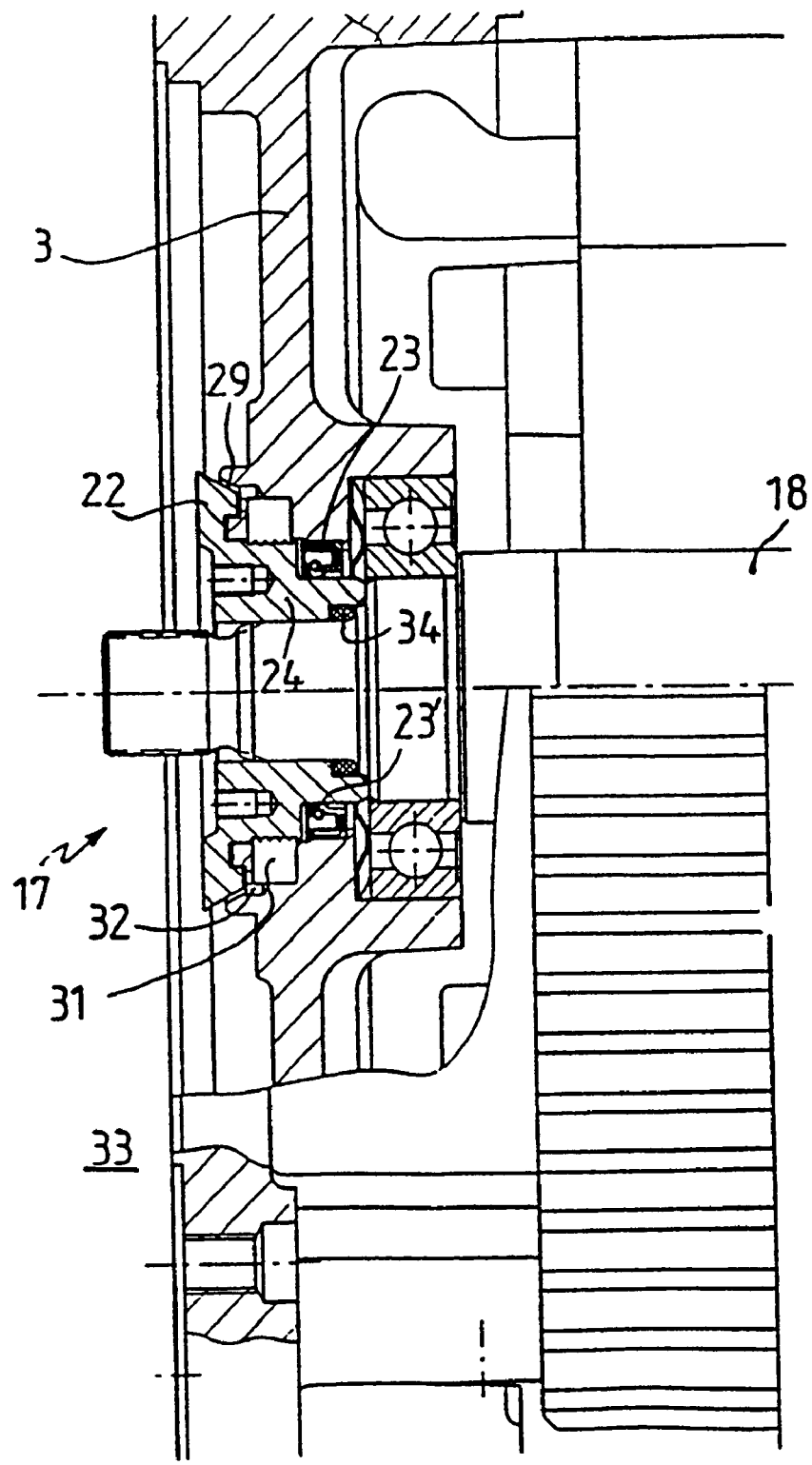
FIG. 3—An alternative sectional representation of the transition region containing the sealing system according to the invention.

FIG. 3 shows an alternative embodiment of the sealing system in the transition region 17, from the fast-running drive shaft 18 of the motor that is not shown herein to the gear unit 3. The essential structural components have already been correspondingly acknowledged in FIG. 2. As a result of the geometric design of the cover and suctioning element 22, it is prevented on the one hand that essential amounts of lubricating oil can reach the area of labyrinth 29 and thus the region of sealing element 23, in particular the sealing lip 23'. As previously addressed, it is not important for the operating mode of the subject matter of the invention whether the sealing element 23 is present or not because the lubricating oil is re-circulated during this mode. The amounts of lubricating oil that actually reach the region of sealing element 23 are circulated back to the collection chamber 31 via the channel system 30, provided in the region of centrifugal element 24, even if the sealing lip 23' and the following lip 38 fail. From there, it flows back via the channel 32 to the gear unit inside chamber 33. The cover and suctioning element 22 and the centrifugal element 24 together form a one-piece component, which is sealed against the shaft 18 by means of a statically effective sealing element 34.

In comparison to FIG. 2, an even simpler installation unit is created here, which furthermore makes it possible to omit the transport safety device.

What is claimed is:

1. A sealing system for fast-running motors with a directly flanged-on gear unit, used for passenger conveyor systems such as escalators and moving walkways, said sealing system including:

at least one sealing element comprising a radial shaft seal;

at least one centrifugal element;

at least one cover and suctioning element; and a lubricating oil collection chamber, provided in a region of the centrifugal element and connected via at least one channel that extends in the direction of the cover and suctioning element to a gear unit chamber of the gear unit, the gear unit chamber being located above an oil level in an intake region of the cover and suctioning element, wherein the cover and suctioning element is arranged between the gear unit and the sealing element, the centrifugal element comprises a labyrinth-type channel system, which circulates lubricating oil in the direction of the lubricating oil collection chamber, and the centrifugal element has an angular design in the cross section and that a leg with a larger dimension in a radial direction contains the labyrinth-type channel system and a leg with smaller dimension in a radial direction is designed as a sealing surface for the radial shaft seal with multiple lips.

2. A sealing system according to claim 1, wherein the cover and suctioning element has a disk-shaped design with an outer peripheral surface tapered in the direction of the sealing element.

3. A sealing system according to claim 1, further comprising a labyrinth that extends on a gear unit side between the cover and suctioning element and the sealing element.

4. A sealing system according to claim 1, wherein the centrifugal element comprises a labyrinth-type channel system, which circulates lubricating oil in the direction of the lubricating oil collection chamber.

5. A sealing system according to claim 1, wherein the centrifugal element is connected via at least one statically effective sealing element with a motor output shaft.

6. A sealing system according to claim 1, wherein the cover and suctioning element and the centrifugal element together form a single unit.

7. A sealing system according to claim 1, wherein the centrifugal element, the sealing element and the cover and suctioning element are designed to form a single installation unit.

8. A sealing system for fast-running motors with a directly flanged-on gear unit, used for passenger conveyor systems such as escalators and moving walkways, said sealing system including:

at least one sealing element comprising a radial shaft seal;

at least one centrifugal element;

at least one cover and suctioning element, the cover and suctioning element having a disk-shaped design with an outer peripheral surface tapered in the direction of the sealing element; and a lubricating oil collection chamber, provided in a region of the centrifugal element and connected via at least one channel that extends in the direction of the cover and suctioning element to a gear unit chamber of the gear unit, the gear unit chamber being located above an oil level in an intake region of the cover and suctioning element, wherein the cover and suctioning element is arranged between the gear unit and the sealing element, and the oil level in the gear unit chamber is designed to reach below the cover and suctioning element in the fully mounted condition.

9. A sealing system for motors, in particular for drive units comprising fast-running motors with directly flanged-on gear units, used especially for passenger conveyor systems such as escalators and moving walkways, said sealing system comprising:

at least one sealing element that is designed as radial shaft seal, at least one centrifugal element, as well as at least one cover and suctioning element, wherein the cover and suctioning element is arranged on a gear unit side in front of the sealing element and wherein a lubricating oil collection chamber, provided in a region of centrifugal element, is connected via at least one channel that extends in the direction of the cover and suctioning element to a gear unit chamber, which is located in an intake region of the cover and suctioning element, somewhat above an oil level, and a transport safety device that blocks the at least one channel against the lubricating oil collection chamber for transport and mounting purposes and which can be removed once the passenger conveyor system is fully installed.

10. A sealing system for fast-running motors with a directly flanged-on gear unit, used for passenger conveyor systems such as escalators and moving walkways, said sealing system including:

at least one sealing element comprising a radial shaft seal;

at least one centrifugal element;

at least one cover and suctioning element;

a lubricating oil collection chamber, provided in a region of the centrifugal element and connected via at least one channel that extends in the direction of the cover and suctioning element to a gear unit chamber of the gear unit, the gear unit chamber being located above an oil level in an intake region of the cover and suctioning element; and a transport safety device that blocks the at least one channel against the lubricating oil collection chamber for transport and mounting purposes and which can be removed once the passenger conveyor system is fully installed, wherein the cover and suctioning element is arranged between the gear unit and the sealing element.

* * * * *